United States Patent
Senoo et al.

(10) Patent No.: US 11,985,059 B2
(45) Date of Patent: May 14, 2024

(54) COMMUNICATION DEVICE, MULTICAST TRANSFER SYSTEM, AND MULTICAST TRANSFER METHOD

(71) Applicant: Nippon Telegraph and Telephone Corporation, Tokyo (JP)

(72) Inventors: Ryuma Senoo, Tokyo (JP); Shigemasa Kumagawa, Tokyo (JP); Ken Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 365 days.

(21) Appl. No.: 17/415,502

(22) PCT Filed: Dec. 24, 2019

(86) PCT No.: PCT/JP2019/050609
§ 371 (c)(1),
(2) Date: Jun. 17, 2021

(87) PCT Pub. No.: WO2020/145131
PCT Pub. Date: Jul. 16, 2020

(65) Prior Publication Data
US 2022/0045938 A1 Feb. 10, 2022

(30) Foreign Application Priority Data
Jan. 7, 2019 (JP) .................. 2019-000676

(51) Int. Cl.
*H04L 12/753* (2013.01)
*H04L 12/18* (2006.01)
(Continued)

(52) U.S. Cl.
CPC .............. *H04L 45/28* (2013.01); *H04L 12/18* (2013.01); *H04L 45/16* (2013.01); *H04L 45/22* (2013.01)

(58) Field of Classification Search
CPC ..... H04L 45/28; H04L 12/1881; H04L 45/48; H04L 12/44; H04L 2212/00; H04L 12/18;
(Continued)

(56) References Cited

U.S. PATENT DOCUMENTS 6,085,238 A * 7/2000 Yuasa .................. H04L 12/4641
370/409
11,070,464 B2 * 7/2021 Goud Gadela ......... H04L 45/24
(Continued)

OTHER PUBLICATIONS

Eckert et al., "Protection Methods for BIER-TE draft-eckert-bier-te-frr-03," IETF Internet-Draft, Mar. 5, 2018, 16 pages.
(Continued)

*Primary Examiner* — Edan Orgad
*Assistant Examiner* — Vanneilian Lalchinthang
(74) *Attorney, Agent, or Firm* — Fish & Richardson P.C.

(57) ABSTRACT

There is provided route control with excellent flexibility even in a large-scale multicast transfer system. A multicast transfer system transfers a multicast packet arriving at a plurality of destinations between multicast communication devices 1, and a packet transfer processing unit 15 of the multicast communication device 1 transfers, when an interface of a multicast communication device 1 adjacent to itself is specified as a transfer destination of a received multicast packet, the multicast packet to the specified interface, and transfers, when the interface of the multicast communication device 1 adjacent to itself is not specified as the transfer destination of the received multicast packet, the multicast packet to an interface to a multicast communication device 1 specified as the destination.

6 Claims, 9 Drawing Sheets

(51) Int. Cl.
*H04L 12/24* (2006.01)
*H04L 45/00* (2022.01)
*H04L 45/16* (2022.01)
*H04L 45/28* (2022.01)
*H04W 36/00* (2009.01)

(58) Field of Classification Search
CPC ..... H04L 45/16; H04L 69/22; H04L 67/1095; H04L 45/22; H04L 41/065; H04L 2001/0095; H04L 45/74; H04W 36/026; H04W 4/08
USPC .......................................................... 370/228
See application file for complete search history.

(56) References Cited

U.S. PATENT DOCUMENTS

| | | | | |
|---|---|---|---|---|
| 2003/0112810 | A1* | 6/2003 | Nakabayashi | H04L 45/48 370/401 |
| 2006/0209826 | A1* | 9/2006 | Kawamura | H04L 45/16 370/390 |
| 2008/0130644 | A1* | 6/2008 | Shibata | H04L 45/16 370/390 |
| 2010/0246415 | A1* | 9/2010 | Nishi | H04L 43/50 370/248 |
| 2016/0254991 | A1* | 9/2016 | Eckert | H04L 12/4633 370/225 |
| 2017/0033939 | A1* | 2/2017 | Bragg | H04L 12/18 |
| 2018/0278522 | A1* | 9/2018 | Asati | H04L 45/74 |
| 2018/0287935 | A1* | 10/2018 | Wang | H04L 12/4625 |
| 2018/0367456 | A1* | 12/2018 | Wijnands | H04L 12/1854 |
| 2020/0245206 | A1* | 7/2020 | Allan | H04L 45/04 |
| 2021/0058260 | A1* | 2/2021 | Xia | H04L 12/4633 |

OTHER PUBLICATIONS

Eckert et al., "Traffic Engineering for Bit Index Explicit Replication (BIER-TE) draft-ietf-bier-te-arch-01," IETF Internet-Draft, Oct. 23, 2018, 33 pages.

Holbrook et al., "Source-Specific Multicast for IP," IETF RFC 4607, Aug. 2006, 20 pages.

Wijnands et al., "Encapsulation for Bit Index Explicit Replication (BIER) in MPLS and Non-MPLS Networks," IETF RFC 8296, Jan. 2018, 25 pages.

Wijnands et al., "Multicast Using Bit Index Explicit Replication (BIER)," IETF RFC 8279, Nov. 2017, 44 pages.

* cited by examiner

Fig. 6

| Bit Position | F-BM | R-BM | Next Hop |
|---|---|---|---|
| 00000001(1) | 11111100 | 00111110 | NODE A |
| 00000010(2) | 11111100 | 00111101 | NODE B |
| : | : | : | : |
| 01000000(7) | 01000000 | 10111111 | NODE G |
| 10000000(8) | 10000000 | 01111111 | NODE H |

| Bit Position | Adjacency |
|---|---|
| 00000010(2) | forward_connected(IF2) |
| 00000100(3) | forward_connected(IF3) |

| Bit Position | Adjacency |
|---|---|
| 01000000(7) | local_decap() |

COMMUNICATION DEVICE, MULTICAST TRANSFER SYSTEM, AND MULTICAST TRANSFER METHOD

CROSS-REFERENCE TO RELATED APPLICATIONS

This application is a National Stage application under 35 U.S.C. § 371 of International Application No. PCT/JP2019/050609, having an International Filing Date of Dec. 24, 2019, which claims priority to Japanese Application Serial No. 2019-000676, filed on Jan. 7, 2019. The disclosure of the prior application is considered part of the disclosure of this application, and is incorporated in its entirety into this application.

TECHNICAL FIELD

The present invention relates to a communication device, a multicast transfer system, and a multicast transfer method.

BACKGROUND ART

As a protocol which achieves IP multicast transfer when achieving a multicast service in a large-scale network, currently PIM-SSM (Non-Patent Literature 1) is widely used. In the PIM-SSM, a join message indicating a viewing request from a viewer is distributed on a distribution server side, and a multicast packet is transferred from the distribution server side onto a route through which the join message has passed.

The join message flows from an egress edge router (egress side device, hereinafter) positioned on a viewer side within a provider network to an ingress edge router (ingress side device, hereinafter) positioned on the distribution server side. Each relay device on the route of the join message becomes capable of communication of IP multicast transfer by holding route information for each registration channel. The registration channel is defined for each (S, G) state which is combined information of "S" as an address of a distribution server and "G" as an address of a multicast group.

However, the PIM-SSM has following three technical problems.

(Problem 1: flexibility) Since the passing route of the join message is an underlay calculation route (IGP (Interior Gateway Protocol) route, hereinafter), it is impossible to flexibly specify a distribution tree according to a service characteristic.

(Problem 2: scalability) All devices on the join message passing route have to hold the route information for each registration channel. Therefore, when the number of registration channels rapidly increases in the future, in a non-edge router (relay device) within the provider network, loads increases as the route information is concentrated.

(Problem 3: reliability) When the route fails within the network, the IGP route is switched after the fault is detected, the join message of each channel is redistributed along the IGP route after reconvergence, the registration channel is updated in all the devices on the join message passing route, and thus the communication of the IP multicast transfer is recovered. Therefore, there is a risk that switch time before communication recovery becomes long due to join message retransmission delay accompanying increase of the number of the channels or join message loss within the network.

As a technology for solving (problem 2: scalability) among the problems, BIER (Bit Index Explicit Replication) defined in Non-Patent Literature 2 has been proposed. As compared to the PIM-SSM, the BIER satisfies high scalability regarding the number of holding routes.

FIG. 8 is a network chart illustrating transfer processing of the BIER. In the network chart, a plurality of nodes are connected. In FIG. 8, after "n" indicating a node, one character (A, B, C . . . ) indicating an identifier of each node is described. For example, a node A illustrated as "nA" is the node illustrated on the most left in FIG. 8.

Hereinafter, description will be given based on multicast communication in which a transfer packet is transferred from the node A which is the ingress side device via relay devices (a node X, a node D) to two egress side devices (a node Y and a node Z). Note that, in the node D, a destination is branched into multiple.

A numeric string inside a packet such as "0011" indicates a transfer BS (Bit String) which is a data structure indicating the destination inside the transfer packet. In one transfer BS, one egress side device is allocated to each bit, and a bit value "1" corresponds to a specified destination.

For example, a transfer BS "0011" indicates, from a right side of the bit string to the head, that first and second egress side devices are the destinations but third and fourth egress side devices are not the destinations. In this way, a bit for each destination configuring the transfer BS is referred to as a transfer BP (Bit Position). The transfer BS "0011" includes four transfer BPs and the destination is specified at two places of the four transfer BPs.

One transfer BP is allocated to one egress side device within a network. In FIG. 8, the transfer BP allocated as the first egress side device to the node Y is illustrated as "0001(1)" of a black oval mark. That is, "1" in parenthesis indicates the first egress side device. Similarly, the transfer BP allocated as the second egress side device to the node Y is "0010(2)".

The ingress side device includes the transfer BS specifying the transfer BP corresponding to the egress side device of the destination in a transfer packet header, and sends out the transfer packet. The relay device refers to the transfer BS of the received transfer packet and a transfer table (transfer information) of itself, and transfers the transfer packet toward the egress side device.

FIG. 9 is a transfer table that the node X in FIG. 8 uses for transfer processing.

In the transfer table, for each transfer BP of the transfer packet, F-BM (Forward Bit Mask) and Next Hop are made to correspond as information used for the transfer processing of the transfer packet.

The Next Hop indicates a next transfer destination router adjacent to itself on the IGP route. The F-BM is used in processing of updating the transfer BS of the transfer packet to be transferred to the Next Hop.

The F-BM is a bit sum of the transfer BPs of the same Next Hop. For example, since the Next Hop "node D" of the transfer BP "0001(1)" and the Next Hop "node D" of the transfer BP "0010(2)" are the same, the F-BM of both records is the bit sum "0011" of "0001" and "0010".

Hereinafter, specific transfer processing using the Next Hop and the F-BM of the transfer table will be described with FIG. 10.

FIG. 10 is a flowchart illustrating the transfer processing of the BIER. The flowchart is executed every time the node of itself receives the transfer packet from an upstream side.

As S101, the node determines whether or not all the transfer BPs of the transfer packet have a value 0. Processing is ended when it is Yes in S101, and advances to S102 when it is No.

As S102, the node acquires a rightmost bit of the bit value "1" from the transfer BS, and acquires entries (F-BM, Next Hop) corresponding to the rightmost bit from the transfer table. For example, while the bit value "1" are present at two places (the second bit and the fourth bit from the right) in the transfer BS "1010", the rightmost bit is the second bit from the right.

As S103, the node determines whether or not the rightmost bit acquired in S102 is the bit allocated as the egress side device to itself, that is, whether or not the transfer packet is addressed to itself. The processing advances to S106 when it is Yes in S103, and advances to S104 when it is No.

As S106, the node copies the transfer packet, takes out a header portion from the transfer packet of the copy destination, extracts a remaining data portion, and delivers the data portion to a next protocol. In addition, for the transfer packet of a copy source preserved in the present device, the bit addressed to itself within the transfer BS (the rightmost bit in S103) is cleared with the value 0. Then, the processing is returned to S101.

As S104, the node copies the transfer packet, masks (updates) the transfer BS of the copied transfer packet with the F-BM, and then performs transfer to the Next Hop.

As S105, the node masks (updates) the transfer BS of the transfer packet preserved in the present device with ~F-BM. The ~F-BM is a bit string for which the individual bits of the F-BM are inverted. Then, the processing is returned to S101.

For example, in the case where the transfer BS is "0111" and the F-BM is "0011", the ~F-BM is "1100". Therefore, the transfer BS of the transfer packet transferred in S104 becomes "0011" (the third bit is masked), and the transfer BS of the transfer packet updated in S105 becomes "0100" (the first and second bits are masked).

The BIER has been described above with reference to FIG. 8-FIG. 10. Here, a preparation method of the transfer table used for the BIER will be described.

The transfer BP allocated to the egress side device is advertised within the network, and route information corresponding to each transfer BP is generated inside the transfer table in the relay device. At the time, the relay device holds only the route information for the number of the egress side devices.

Thus, since a data amount of the transfer table is independent of the number of registration channels within the network, even when the number of the registration channels rapidly increases in the future, there is no risk of load increase in the relay device. That is, the BIER is a system indicating high scalability regarding the number of holding routes.

In the meantime, in the multicast transfer, there is also a need of specifying not only the destination of the transfer packet but also a passing route in the relay device to the destination. It is because a traffic control function and a high-speed switch function when a fault occurs can be achieved by specifying the passing route.

Thus, Non-Patent Literatures 3 and 4 propose BIER-TE (Traffic Engineering) for which the traffic control function and the high-speed switch function are added to the BIER.

FIG. 11 is a network chart illustrating the transfer processing of the BIER-TE. As compared to the network chart of the BIER described in FIG. 8, the destination to allocate the transfer BP is changed from the egress side device to a device interface (IF: Interface) of each router.

For example, while there are the IFs connected with the nodes A, B and D respectively at a total of three places in the node X, the transfer BP "1" is allocated to the IF with the node A among the IFs (see a balloon attached to a black oval). The transfer BP "1" indicates the first bit of the transfer BS.

By describing the IF to pass through in a distribution tree in the transfer BS, the node A which is the ingress side device explicitly specifies a distribution route of the transfer packet in an end-to-end manner, and becomes capable of flexible route control. For example, for the illustrated packet of the transfer BS "11111011", the distribution route that passes through first, second, fourth, fifth, sixth, seventh and eighth IFs is specified from the right side of the bit string.

The relay device manages the route information regarding the transfer BP allocated to the IF adjacent to itself, and transfers the transfer packet to the adjacent IF while collating the route information and the transfer BS of the inputted transfer packet header.

FIG. 12 is a transfer table that the node X in FIG. 11 uses for the transfer processing. The transfer table manages sets of Bit Position indicating the transfer BP and Adjacency indicating next processing contents for the transfer packet corresponding to the transfer BP. Adjacency "forward_connected (transfer destination IF)" indicates that the transfer packet is to be transferred to the transfer destination IF adjacent to itself.

FIG. 13 is a transfer table that the node Y in FIG. 11 uses for the transfer processing. Here, "local_decap( )" is set as Adjacency. The setting indicates that itself is the egress side device, and thus indicates that the header for the BIER-TE is to be taken off and the transfer packet is to be delivered to the next protocol (IP or the like, for example).

FIG. 14 is a flowchart illustrating the transfer processing of the BIER-TE.

As S201, the node determines whether or not a fault of an adjacent node or an adjacent link is detected. The processing advances to S202 when it is Yes in S201, and advances to S203 when it is No.

As S202, the node adds a bypass route calculated beforehand as protective setting of the adjacent node or the adjacent link to the transfer BS in the header of the transfer packet. That is, by overwriting the route at normal time specified in the transfer packet with the bypass route, the node can switch the route at a high speed so as to avoid the fault adjacent node or adjacent link.

As S203, the node copies the transfer packet as a reference packet, and clears a (non-adjacent) reference BP not adjustment to itself from a reference BS of the copied reference packet. Note that, similarly to that the transfer BS is present in the packet header of the transfer packet and the transfer BS is configured from the plurality of transfer BPs, the reference BS is present in the packet header of the reference packet and the reference BS is configured from the plurality of reference BPs.

The reference packet is used to store the reference BP for which the transfer processing is already performed in the present device and the reference BP for which the processing is not performed yet as a temporary state.

As S204, the node clears the transfer BP adjacent to itself in the transfer BS of the transfer packet.

Hereinafter, S211-S215 are loop processing of appropriately transferring the transfer packet while updating the reference BS of the reference packet.

As S211, the node determines whether or not the values of the reference BPs configuring the reference BS are all 0. The processing regarding the transfer packet this time is ended when it is Yes in S211, and the processing advances to S212 when it is No.

As S212, the node acquires the rightmost bit of the bit value "1" from the reference BS, and writes out the reference BS so as to clear the acquired rightmost bit. Then, the node acquires the entries (Bit Position, Adjacency) corresponding to the rightmost bit from the transfer table.

As S213, the node determines whether or not the transfer packet is addressed to itself depending on whether or not the acquired Adjacency is local_decap( ). The processing advances to S214 when it is Yes in S213, and advances to S215 when it is No.

As S214, the node copies the transfer packet, takes out the header of the copied transfer packet and performs delivery to the next protocol.

As S215, the node copies the transfer packet, and transfers the copied transfer packet from the forward_connected IF specified in the table. After the processing of S214 and S215, the processing is returned to S211.

The BIER-TE has been described above with reference to FIG. 11-FIG. 14. In the BIER-TE capable of specifying an arbitrary distribution tree, as compared to the BIER, flexible traffic control and high-speed switch control when the route fails become possible. In addition, the route information held by the relay device is the number of IFs adjacent to itself and is independent of the number of the registration channels.

Note that, in the BIER-TE, the number of the bits of the transfer BPs allocated to the transfer BS increases more than the BIER so that header information accommodating the transfer BS becomes large. Since a payload of the data portion is reduced as an ill effect of enlargement of the header information, transfer efficiency of user data declines.

Here, Non-Patent Literature 5 describes a specification of limiting an upper limit of the number of the transfer BPs that can be allocated.

CITATION LIST

Non-Patent Literature

Non-Patent Literature 1: H. Holbrook, et al., "Source-Specific Multicast for IP", [online], IETF RFC 4607, August 2006, [searched on Dec. 21, 2018], Internet <URL: https://tools.ietf.org/html/rfc4607>

Non-Patent Literature 2: I J. Wijnands, et al., "Multicast Using Bit Index Explicit Replication (BIER)", [online], IETF RFC 8279, November 2017, [searched on Dec. 21, 2018], Internet <URL: https://tools.ietf.org/html/rfc8279>

Non-Patent Literature 3: T. Eckert, et al., "Traffic Engineering for Bit Index Explicit Replication (BIER-TE)", [online], IETF Intrenet-Draft draft-ietf-bier-te-arch-01, October 2018, work in progress, [searched on Dec. 21, 2018], Internet <URL: https://tools.ietf.org/html/draft-ietf-bier-te-arch-01>

Non-Patent Literature 4: T. Eckert, et al., "Protection Methods for BIER-TE", [online], IETF Internet-Draft draft-eckert-bier-te-frr-03, March 2018, work in progress, [searched on Dec. 21, 2018], Internet <URL: https://tools.ietf.org/html/draft-eckert-bier-te-frr-03>

Non-Patent Literature 5: I J. Wijnands, et al., "Encapsulation for Bit Index Explicit Replication (BIER) in MPLS and Non-MPLS Networks", [online], IETF RFC 8296, January 2018, [searched on Dec. 21, 2018], Internet <URL: https://tools.ietf.org/html/rfc8296>

SUMMARY OF THE INVENTION

Technical Problem

As described above, the BIER is a mechanism of allocating the transfer BP only to the egress side device within the network, and is excellent in the scalability regarding the number of holding routes. The BIER-TE is the mechanism of allocating the transfer BP to the IF of all the devices within the network, and is excellent in the flexibility of route control.

In other words, the relay device to the egress side device cannot be specified in the BIER, and it is difficult to increase the scale of the number of holding routes in the BIER-TE.

That is, the BIER and the BIER-TE are in a relation that advantages and disadvantages are contradictory.

Therefore, a main object of the present invention is to provide route control with excellent flexibility even in a large-scale multicast transfer system.

Means for Solving the Problem

In order to solve the problem, a communication device of the present invention has following characteristics.

The present invention is the communication device used in a multicast transfer system that transfers a multicast packet arriving at a plurality of destinations between communication devices, and a packet transfer processing unit of the communication device transfers, when an interface of a communication device adjacent to itself is specified as a transfer destination of a received multicast packet, the multicast packet to the specified interface, and transfers, when the interface of the communication device adjacent to itself is not specified as the transfer destination of the received multicast packet, the multicast packet to an interface to a communication device specified as the destination.

Thus, by preferentially transferring the multicast packet to the interface specified as the transfer destination, flexible traffic control is made possible. In addition, by transferring the multicast packet to the communication device specified as the destination, a data amount of a packet header needed for specifying the communication device can be small, high route scalability is made possible and decline of transfer efficiency can be suppressed. Therefore, IP multicast transfer capable of the flexible traffic control can be applied to a large-scale network by the high route scalability.

That is, since information that determines a next hop of the multicast packet can utilize both of the interface of the transfer destination and the communication device of the destination, the need of allocating information of the transfer destination to the interfaces of all the transfer destinations is eliminated. Therefore, a route identifier for specifying the interface of the transfer destination can be (not comprehensively but) partially allocated within the network.

In the present invention, the communication device further includes a packet reception determination unit, and the packet reception determination unit omits transfer processing of the multicast packet by the packet transfer processing unit when the communication device of itself is specified as the destination of the received multicast packet.

Thus, by executing the packet reception determination unit immediately after packet-in, unintentional transfer after the packet arrives at an egress side device can be prevented.

In the present invention, the communication device further includes a bypass route switch unit, and the bypass route switch unit controls the packet transfer processing unit so as to transfer the multicast packet to a bypass route for bypassing a fault occurrence place by adding the bypass route set beforehand as the transfer destination of the received multicast packet when a fault occurs.

Thus, by preparing partial protective setting within the network, high-speed switch when a route fails can be achieved.

In the present invention, the received multicast packet includes a bit string for which a bit indicating whether or not to pass through each interface of the transfer destination and a bit indicating whether or not each communication device to be a destination candidate is to be the destination are arranged in order, and the packet transfer processing unit determines whether or not to transfer the multicast packet by reading the bit string in order from the multicast packet, and when a bit of an interface of a communication device adjacent to itself is turned to transfer completed, also turns a bit of the communication device specified as the destination to transfer completed.

Thus, inconvenience of performing transfer to the communication device of the destination even when the interface of the transfer destination is specified can be prevented.

The present invention is a multicast transfer system configured by connecting the plurality of communication devices, an IGP route to the communication device specified as a destination of a multicast packet is registered in transfer information in each communication device used in the multicast transfer system, a TE route specifying an interface of the communication device specified as a transfer destination of the multicast packet is registered in the transfer information in some of the communication devices used in the multicast transfer system, and a packet transfer processing unit of each communication device used in the multicast transfer system refers to the transfer information and specifies the interface of itself to pass through when transferring the multicast packet.

Thus, since the TE route can be partially set within the network, the TE route can be selectively set to a required place within the network.

Effects of the Invention

According to the present invention, there can be provided route control with excellent flexibility even in a large-scale multicast transfer system.

BRIEF DESCRIPTION OF DRAWINGS

FIG. 6 is a block diagram of a transfer table relating to the present embodiment.

DESCRIPTION OF EMBODIMENTS

Hereinafter, one embodiment of the present invention will be described in detail with reference to the drawings.

A main characteristic of a multicast transfer system of the present embodiment is that an IGP route used in BIER and a TE route used in BIER-TE are constructed so as to coexist in the same transfer system. Therefore, a transfer BS of a transfer packet includes both of a transfer BP of the IGP route and a transfer BP of the TE route.

Hereinafter, transfer processing on the two kinds of routes is illustrated as following three patterns.

(Pattern 1 in FIG. 1) The case of performing transfer by the IGP route from an ingress side device to an egress side device. In this case, in the transfer BS, only the transfer BP of the egress side device of the IGP route is specified as a passing point.

(Pattern 2 in FIG. 2) The case of performing the transfer by the TE route from the ingress side device to the egress side device. In this case, in the transfer BS, in addition to the transfer BP of the egress side device of the IGP route, all IFs of the TE route to pass through are specified as the passing points.

(Pattern 3 in FIGS. 3 and 4) The case of avoiding a fault link during the transfer in the pattern 1. In this case, only the egress side device of the IGP route is specified in the transfer BS, and the TE route of a bypass is additionally described on a node right above the fault link.

Figure 1:
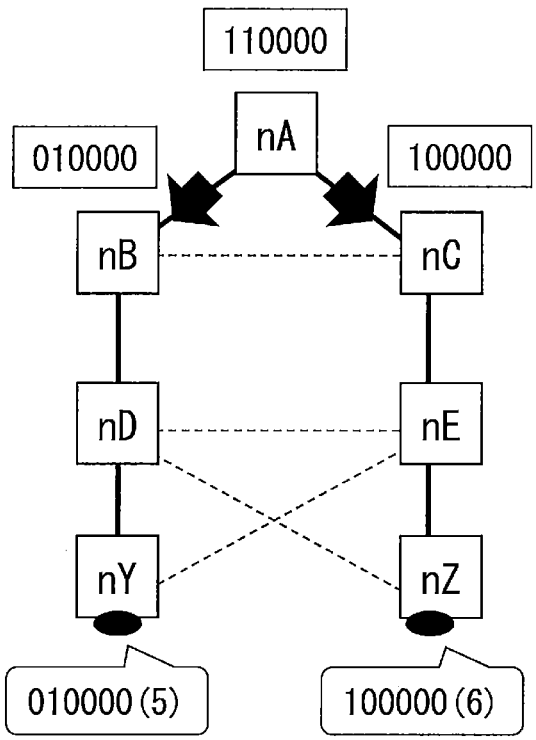
FIG. 1 is a network chart illustrating transfer processing by an IGP route relating to a present embodiment.

FIG. 1 is a network chart illustrating transfer processing by the IGP route as the pattern 1.

A node A which is the ingress side device transmits a transfer packet of a transfer BS "110000" for which two egress side devices (a fifth bit, a sixth bit) are a destination (value "1"). At the time, the node A performs branching (copying) into a transfer BS "010000" addressed to a node Y and a transfer BS "100000" addressed to a node Z and performs the transfer respectively. Then, the transfer packet addressed to the node Y reaches the node Y by the IGP route of the nodes A→B→D→Y. The transfer packet addressed to the node Z reaches the node Z by the IGP route of the nodes A→C→E→Z.

Figures 8, 9:
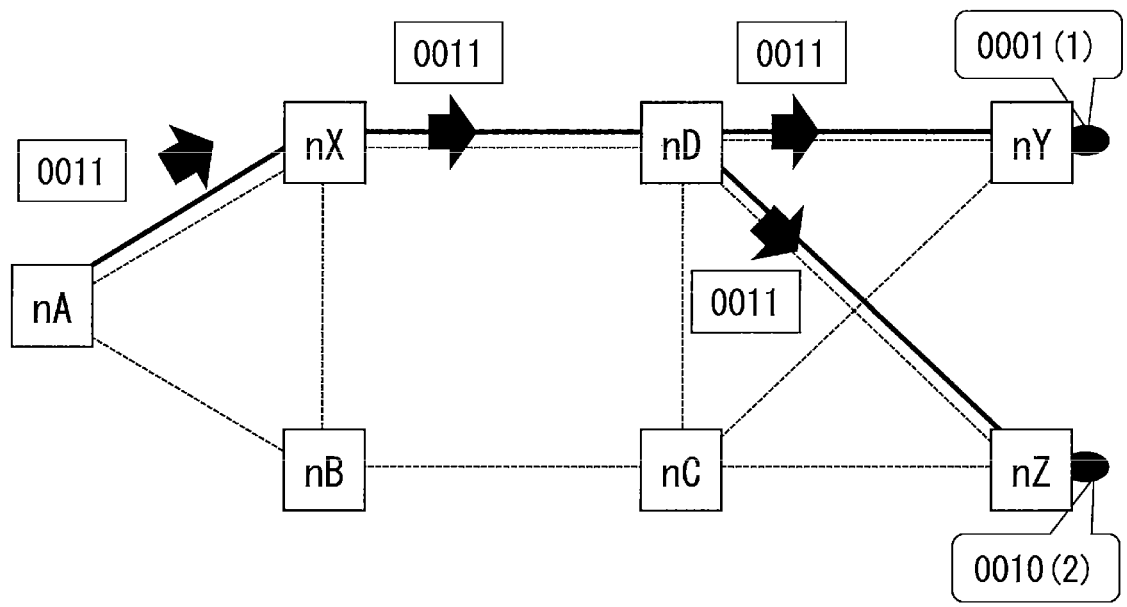
FIG. 8 is a network chart illustrating transfer processing of BIER.
FIG. 9 is a transfer table that a node X in FIG. 8 uses in the transfer processing.

That is, in the pattern 1, the TE route of the first bit-the fourth bit of the transfer BS is not used so that a transfer result is same as BIER in FIG. 8.

Figure 2:
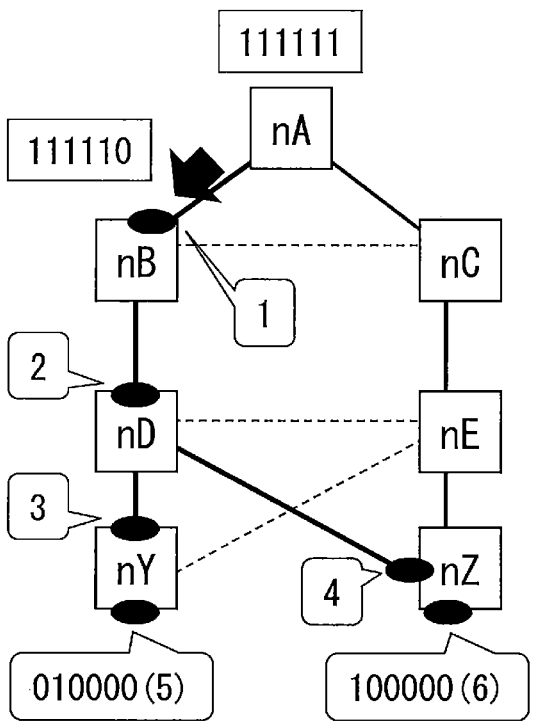
FIG. 2 is a network chart illustrating transfer processing by a TE route relating to the present embodiment.

FIG. 2 is a network chart illustrating transfer processing by the TE route as the pattern 2.

The node A which is the ingress side device transmits the transfer packet of a transfer BS "111111" specifying transfer BPs of all passing IFs (the first bit-the fourth bit) of the TE route in addition to the transfer BPs for which the two egress side devices (the fifth bit, the sixth bit) are the destination.

The nodes A, B and D which are relay devices transfer the received transfer packet according to the TE route of the transfer BS respectively. Here, in the case of specifying the TE route and performing the transfer, the bits corresponding to the passing IFs are successively cleared while performing hop-by-hop transfer in an IF unit along the specified route.

The nodes Y and Z which are the egress side devices recognize that the nodes themselves are the destinations of the transfer packet by the transfer BP of the present device specified as the IGP route.

In such a manner, in the pattern 2 in FIG. 2, a point that an end-to-end TE route of the ingress side device—the relay device—the egress side device is specified is in common with the BIER-TE. On the other hand, a difference from the BIER-TE is the point that a router to which the transfer BP is not allocated as the TE route may be present since the IGP route is distributed to all the routers similarly to FIG. 1 in the pattern 2 in FIG. 2. In other words, conventional bit allocation by the BIER-TE is comprehensive in the entire network but bit allocation in the present embodiment is partial.

For example, in FIG. 2, though the transfer BP of the TE route is not allocated to the nodes C and E, the transfer packet, the destination of which is the egress side device (the sixth bit), can be transferred by the IGP route of the nodes A→C→E→Z.

In such a manner, in the present embodiment, the transfer BP can be partially allocated to the place where traffic control is needed. Thus, it is possible to achieve the traffic control according to a service characteristic, such as performing the transfer by the TE route for a specified service of large-capacity video distribution or the like and performing the transfer by the IGP route for the other general data distribution services.

Note that, in the TE route in FIG. 2, by taking a large amount consumption band by large-capacity video data into consideration and performing branching on a downstream side of the node D, the consumption band of the entire network is saved.

Figure 3:
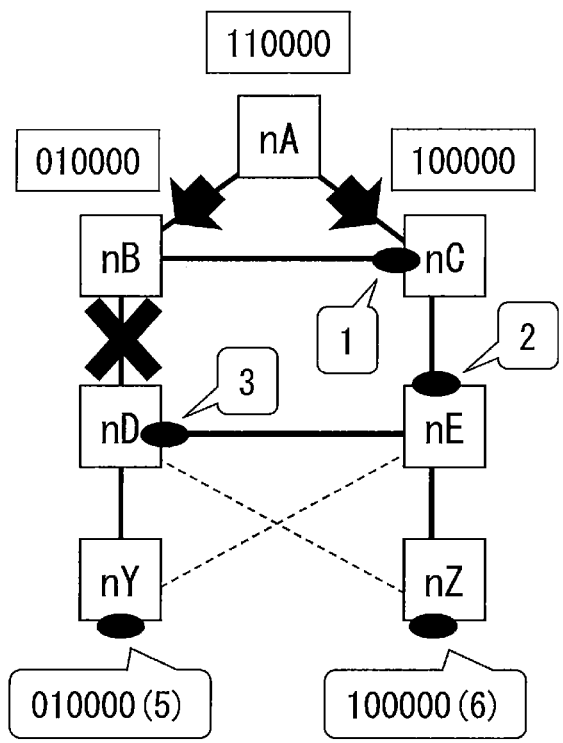
FIG. 3 is a network chart illustrating a bypass route in a case of avoiding a fault link relating to the present embodiment.

FIG. 3 is a network chart illustrating a bypass route in the case of avoiding a fault link as the pattern 3.

In a normal state before fault occurrence, it is assumed that packet transfer branched into two from the node A is performed similarly to the pattern 1 in FIG. 1. Then, it is assumed that the node B detects a fault of an adjacent link with the node D. In addition, it is assumed that the bypass route of the nodes B→C→E→D is prepared as the TE route of the first bit—the third bit before the fault occurrence. That is, partial protective setting between the nodes B and D to be greatly affected by the fault is prepared as the bypass route.

Figure 4:
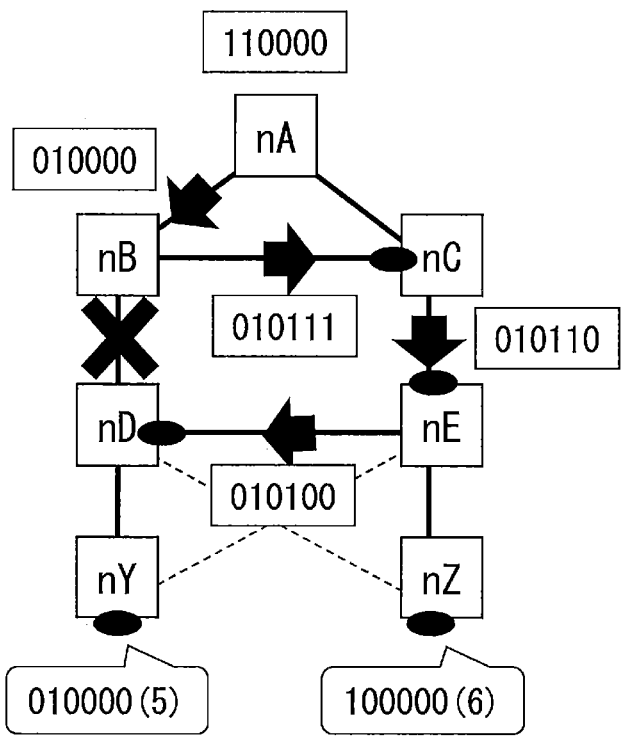
FIG. 4 is a network chart illustrating transfer processing along the bypass route in FIG. 3 relating to the present embodiment.

FIG. 4 is a network chart illustrating transfer processing along the bypass route in FIG. 3.

Upon receiving the transfer packet (transfer BS "010000") addressed to the node Y, the node B transfers the transfer packet (transfer BS "010111") to which the bypass route ("000111") is added to the IF of the node C corresponding to the first bit.

The node C transfers the transfer packet (transfer BS "010110") for which the passed-through first bit is cleared to the IF of the node E corresponding to the next second bit.

Similarly, the passed-through second bit is cleared in the node E, and the passed-through third bit is cleared in the node D. Thus, a bypass between the nodes B→D is achieved.

On the other hand, the transfer packet addressed to the node Z does not pass between the nodes B and D on the IGP route, the bypass is not needed. Thus, the transfer packet addressed to the node Z reaches the node Z by the IGP route of the nodes A→C→E→Z similarly to the FIG. 1.

Figure 5:
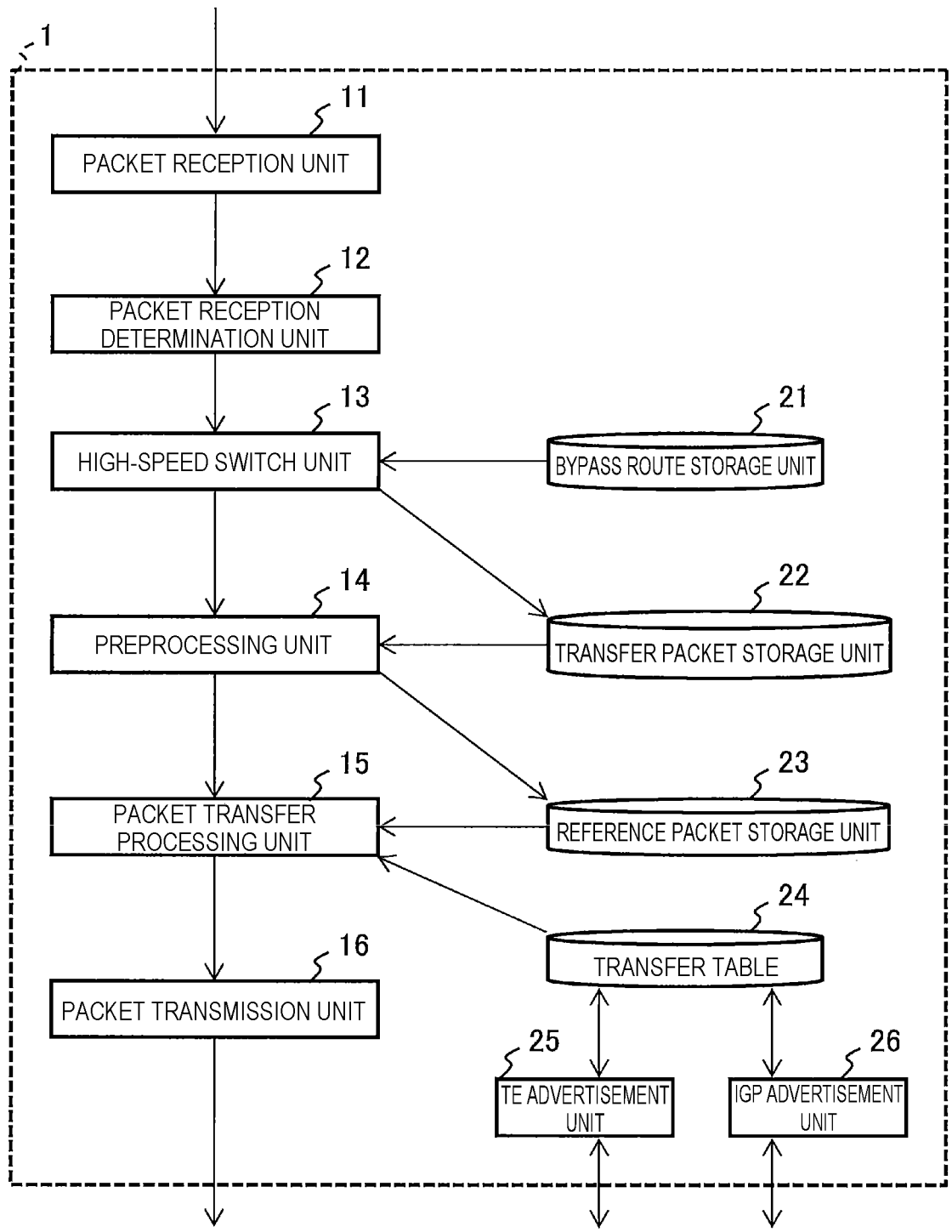
FIG. 5 is a block diagram of a multicast communication device relating to the present embodiment.

FIG. 5 is a block diagram of a multicast communication device 1.

The multicast communication device 1 (the ingress side device, the relay device, the egress side device) is configured as a computer including a CPU (Central Processing Unit), a memory, storage means (storage unit) such as a hard disk, and a network interface respectively.

In the computer, the CPU executes a program (referred to also as an application or an app as the abbreviation) read onto the memory, and thus operates a control unit (control means) configured by individual processing units.

The multicast communication device 1 includes, as the processing units, a packet reception unit 11, a packet reception determination unit 12, a high-speed switch unit (bypass route switch unit) 13, a preprocessing unit 14, a packet transfer processing unit 15, a packet transmission unit 16, a TE advertisement unit 25, and an IGP advertisement unit 26.

The multicast communication device 1 includes, as storage units, a bypass route storage unit 21, a transfer packet storage unit 22, a reference packet storage unit 23, and a transfer table 24.

The packet reception unit 11 receives the transfer packet from other devices. The packet reception determination unit 12 determines whether or not the received transfer packet is addressed to the present device.

The high-speed switch unit 13 writes the bypass route of a fault place registered in the bypass route storage unit 21 to the transfer packet. The preprocessing unit 14 prepares to transfer one transfer packet to a plurality of Next Hops by copying the transfer packet in the transfer packet storage unit 22 as the reference packet in the reference packet storage unit 23.

The packet transfer processing unit 15 refers to the transfer table 24 in FIG. 6, and determines the transfer destination (Next Hop) of the transfer packet. The packet transmission unit 16 transmits the transfer packet to outside according to the determined transfer destination.

The TE advertisement unit 25 autonomously advertises bits (transfer BPs) of the TE route manually allocated to the individual IFs between the adjacent IFs according to an advertisement system of the BIER-TE, and registers the result in the transfer table 24. In addition, the TE advertisement unit 25 performs alive monitoring between the adjacent IFs.

The IGP advertisement unit 26 autonomously advertises the bits (transfer BPs) of the IGP route manually allocated to the individual egress side devices according to an advertisement system of the BIER, and registers the result in the transfer table 24. Thus, the relay device can hold the IGP route corresponding to the egress side devices of the entire network, and communication to the individual egress side devices is secured. The IGP advertisement unit 26 also performs alive monitoring within the network.

FIG. 6 is a block diagram of the transfer table 24.

The transfer BS of the transfer packet includes both of the transfer BP of the IGP route and the transfer BP of the TE route. Therefore, in the transfer table 24, a TE route 24a and an IGP route 24b are registered. The TE route 24a holds only the entries of the adjacent IF, and the IGP route 24*b* holds the entries of all the egress side devices.

To one transfer BS, six TE bits from the head (from the right side) and two IGP bits from the end are allocated. When copying and transferring the transfer packet, the bits are referred to successively from the rightmost bit so that the TE bits arranged at the head are preferentially referred to. Thus, since a reference order of the IGP bits is on a rear side, unintentional transfer by the IGP route in the relay device can be prevented.

In addition, in FIG. 6, it is assumed that there are two egress side devices, and a bit length of the IGP bits is turned to two bits. On the other hand, in the case of allocating the IGP bit to a newly added egress side device, by increasing the bit length of the IGP bits to three bits and reducing the TE bits to five bits, a boundary position of the TE bits and the IGP bits can be changed. That is, the lengths of both bits may be dynamically changed.

In the transfer table 24, for each [Bit Position] row indicating the transfer BP in the transfer BS, in addition to F-BM used in the transfer processing of the transfer packet and Next Hop indicating the transfer destination of the transfer packet, R-BM (Reset Bit Mask) used in masking processing of the reference packet is newly made to correspond. Hereinafter, individual elements of the transfer table 24 will be described separately for the TE route 24*a* and the IGP route 24*b*.

Advertisement processing for preparing the TE route 24*a* is illustrated in (Procedure 11)-(Procedure 14) below.

(Procedure 11) The TE advertisement unit 25 on an advertisement side advertises the TE bit allocated to the IF to the TE advertisement unit 25 on a reception side within a same segment (within an L2 domain that a certain IF is connected to).

(Procedure 12) The TE advertisement unit 25 on the reception side registers the IF of an advertisement source in the transfer table 24 of itself as the Next Hop corresponding to the advertised TE bit.

(Procedure 13) The TE advertisement unit 25 on the reception side registers the F-BM so as to clear all the TE bits registered in the transfer table 24 of itself (=the TE bits allocated to the IF adjacent to itself). For example, In FIG. 6, since the TE bits of the TE route 24*a* are allocated to the first and second bits, the F-BM for which the first and second bits are "0" and the rest is "1" is registered.

(Procedure 14) The TE advertisement unit 25 on the reception side sets the R-BM so as to clear the bits advertised as the bits for the egress side devices in the IGP route 24*b* in addition to the bit of itself. For example, in FIG. 6, since the IGP bits of the IGP route 24*b* are allocated to the seventh and eighth bits, the R-BM for which the first bit of itself and the seventh and eighth bits are "0" and the reset is "1" is registered on the first row.

By using the R-BM in the (Procedure 14), the reference BS of the IGP route 24*b* is cleared when using the TE route 24*a* so that the inconvenience of transferring the transfer packet also to the IGP route in addition to the TE route can be prevented when executing the traffic control.

Advertisement processing for preparing the IGP route 24*b* is illustrated in (Procedure 21)-(Procedure 24) below.

(Procedure 21) The IGP advertisement unit 26 in the egress side device on the advertisement side advertises a set of a loopback address of itself and the IGP bit allocated to itself to the reception side by IGP or the like.

(Procedure 22) The IGP advertisement unit 26 on the reception side registers "the Next Hop when the advertised loopback address is turned to the destination" corresponding to "the advertised IGP bit" in the transfer table 24. The registered contents respectively correspond to the Next Hop and the Bit Position in the transfer table.

(Procedure 23) The IGP advertisement unit 26 on the reception side calculates the bit sum for each Bit Position of the same Next Hop, and registers the bit sum in the transfer table 24 as the F-BM. On the other hand, for the Bit position without the bit of the same Next Hop, the bit itself is registered in the transfer table 24 as the F-BM. That is, for the IGP route 24*b* in the transfer table 24, a combination of the Bit Position and the F-BM is registered by a same calculation method as the BIER illustrated in FIG. 9.

(Procedure 24) The IGP advertisement unit 26 on the reception side registers a result of inverting the individual bit values of the F-BM in the transfer table 24 as the R-BM.

Thus, reference of the transfer BP for the egress side device in the relay device is made possible.

Figure 7:
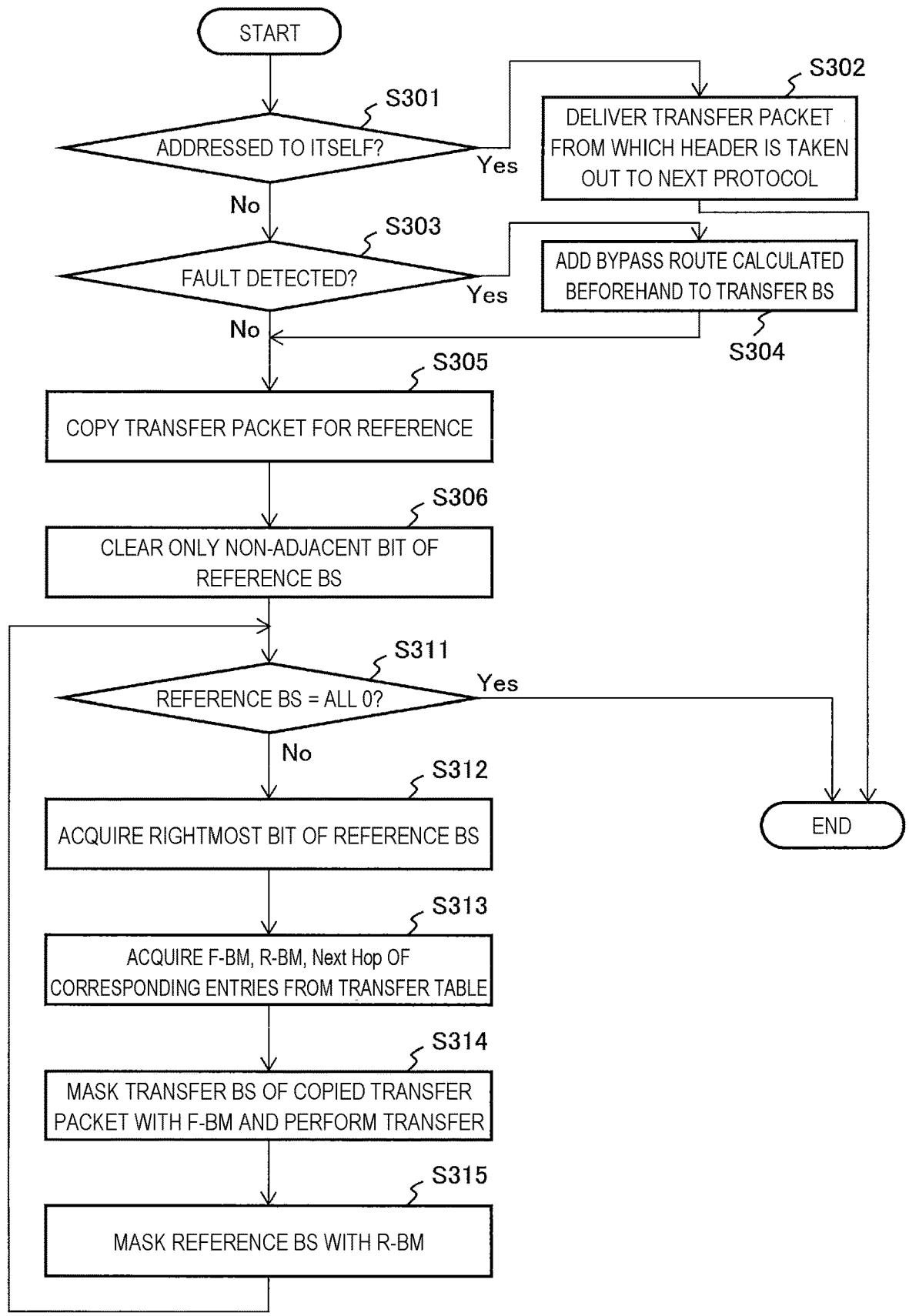
FIG. 7 is a flowchart illustrating transfer processing of the multicast communication device relating to the present embodiment.

FIG. 7 is a flowchart illustrating the transfer processing of the multicast communication device 1. The flowchart is executed every time the packet reception unit 11 receives the transfer packet from the upstream side.

As S301, the packet reception determination unit 12 determines whether or not the received transfer packet is addressed to itself depending on whether or not the IGP bit allocated to itself in the transfer BS has the value "1". The processing advances to S302 when it is Yes in S301, and advances to S303 when it is No.

As S302, the packet reception determination unit 12 takes out a header portion from the transfer packet, extracts a remaining data portion, and delivers the data portion to the next protocol. Then, the transfer processing of the transfer packet is omitted and the processing is ended.

Figure 10:
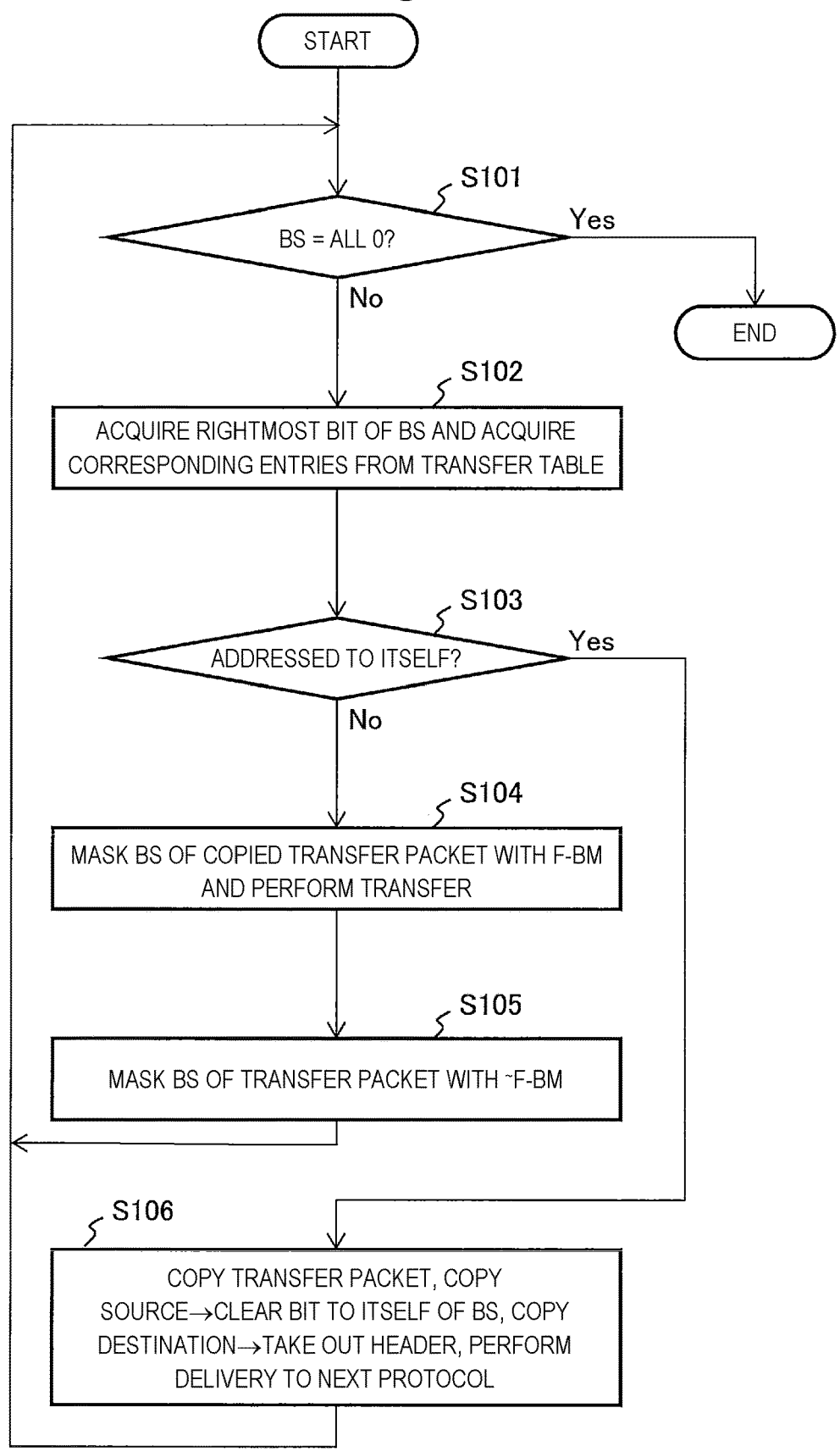
FIG. 10 is a flowchart illustrating the transfer processing of the BIER.
Figures 11, 12, 13:
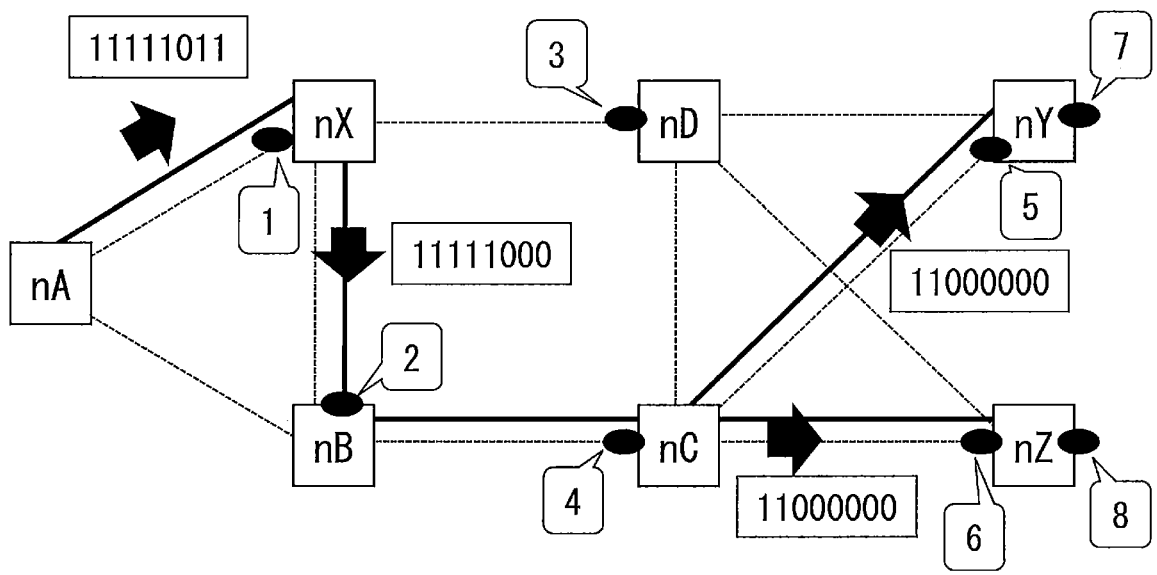
FIG. 11 is a network chart illustrating transfer processing of BIER-TE.
FIG. 12 is a transfer table that a node X in FIG. 11 uses in the transfer processing.
FIG. 13 is a transfer table that a node Y in FIG. 11 uses in the transfer processing.
Figure 14:
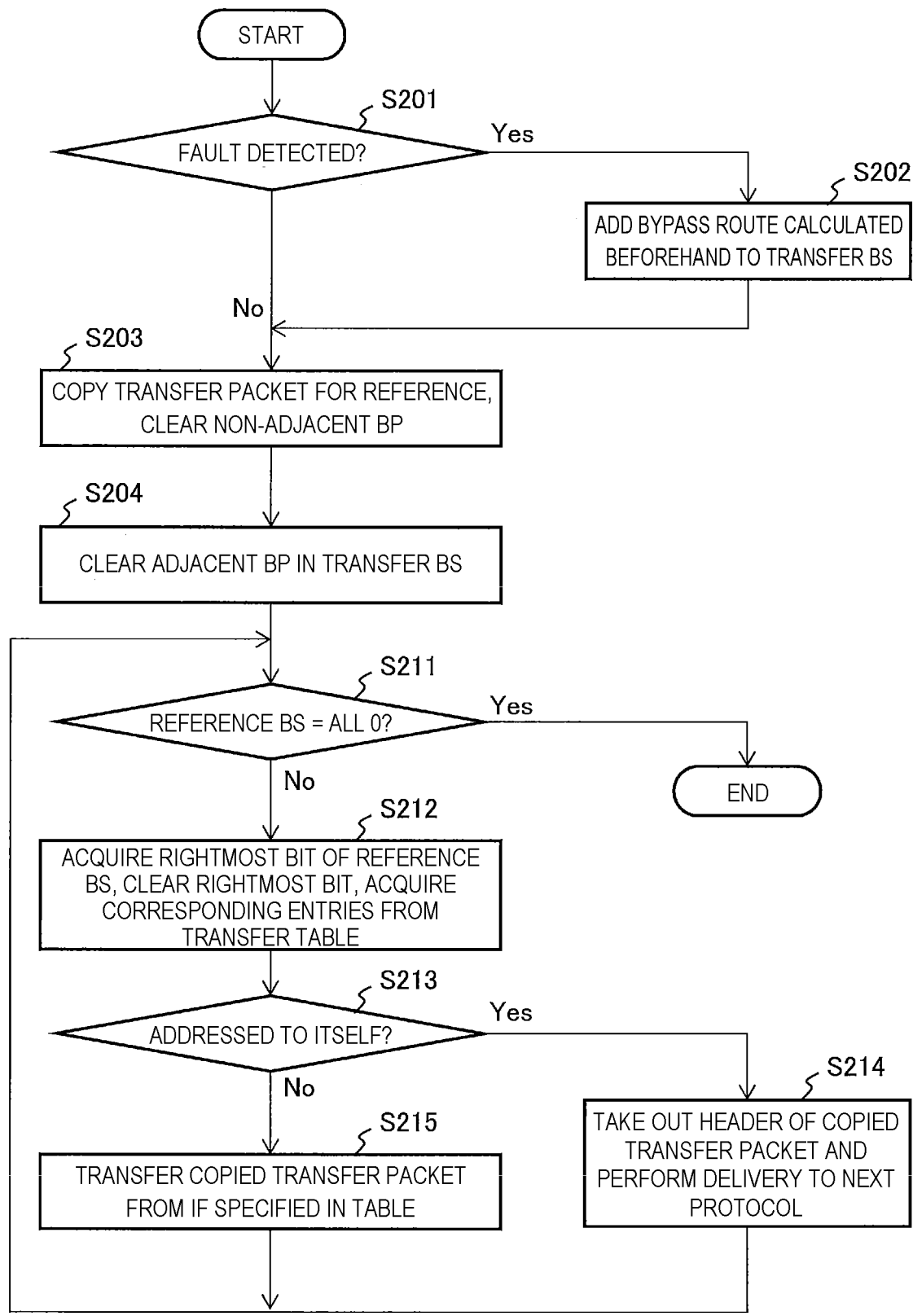
FIG. 14 is a flowchart illustrating the transfer processing of the BIER-TE.

In such a manner, determination processing addressed to itself performed during a loop in the transfer processing in S103 in FIG. 10 is performed immediately after receiving the transfer packet in S301 in FIG. 7.

Thus, the unintentional transfer after the transfer packet arrives at the egress side device is prevented. The unintentional transfer is, for example, unnecessary transfer from a first egress side device to a second egress side device for the transfer packet the destination of which is both of the first egress side device and the second egress side device.

As S303, the high-speed switch unit 13 determines whether or not a fault of an adjacent node or an adjacent link is detected. The processing advances to S304 when it is Yes in S303, and advances to S305 when it is No.

As S304, the high-speed switch unit 13 adds a bypass route calculated beforehand as protective setting of the adjacent node or the adjacent link to the transfer BS in the header of the transfer packet (it is similar to the BIER-TE system in S202).

As S305, the preprocessing unit 14 copies the transfer packet as the reference packet.

As S306, the preprocessing unit 14 clears only the (non-adjacent) TE bit not adjustment to itself of the reference BS. That is, differently from the BIER-TE system in S203, the IGP bits are left without being cleared.

Thus, the IGP bit of the egress side device specified on the ingress side device is also referred to in the relay device so that the transfer by the IGP route in the case of specifying only the egress side device as in the pattern 1 in FIG. 1 is made possible.

Hereinafter, S311-S315 are loop processing of appropriately transferring the transfer packet while updating the reference BS of the reference packet.

As S311, the packet transfer processing unit 15 determines whether or not all the values of the reference BP configuring the reference BS are 0. The processing regarding the transfer packet this time is ended when it is Yes in S311, and the processing advances to S312 when it is No.

As S312, the packet transfer processing unit 15 acquires the rightmost bit of the bit value "1" from the reference BS.

As S313, the packet transfer processing unit 15 acquires the entries (F-BM, R-BM, Next Hop) corresponding to the rightmost bit acquired in S312 from the transfer table 24.

As S314, the packet transfer processing unit 15 copies the transfer packet, masks the transfer BS of the copied transfer packet with the F-BM, and then performs the transfer to the Next Hop in S313.

As S315, the packet transfer processing unit 15 masks the reference BS with the R-BM in S313. Note that, as described in the transfer table 24 in FIG. 6, the R-BM of the TE route 24a and the R-BM of the IGP route 24b are obtained by different calculation methods. Thus, the need of branching the processing of the flowchart for the processing for the TE route 24a and the processing for the IGP route 24b is eliminated.

In the present embodiment described above, the transfer table 24 distinguishes and manages the TE route 24a using the TE bits and the IGP route 24b using the IGP bits. Then, the transfer table 24 includes the R-BM to mask the reference BS of the reference packet in addition to the F-BM to mask the transfer BS of the transfer packet.

Thus, both routes can be made compatible so as to preferentially transfer the transfer packet for which the TE bits are specified in the transfer BS by the TE route 24a and transfer the transfer packet for which the TE bits are not specified by the IGP route 24b.

That is, the TE route 24a can be allocated to the place where it is needed to specify an arbitrary distribution tree and perform the traffic control (the pattern 2 in FIG. 2) or perform the high-speed switch control when a specified place fails by protecting the specific place (the pattern 3 in FIG. 3). On the other hand, at the place where the control is not needed, the transfer packet is transferred according to the IGP route 24b (the pattern 1 in FIG. 1).

Therefore, since the need of comprehensively allocate the TE bits is eliminated, enlargement of the transfer table 24 is suppressed, and the present embodiment can be applied to a large-scale multicast transfer system.

On the other hand, for the existing BIER and the existing BIER-TE, a simultaneous operation respectively with the other system is not assumed. Therefore, just by simultaneously operating the existing BIER and the existing BIER-TE, both systems conflict with each other to begin with, and a correct transfer operation cannot be expected.

Note that, in the present embodiment, as the multicast transfer system, a configuration of two egress side devices as in FIG. 1-FIG. 3 is illustrated. On the other hand, an arbitrary network configuration can be adopted without being limited to such a number of the egress side devices and the relay devices.

In addition, in the present embodiment, a hardware resource of a general computer can be achieved by a program operated as each means of the multicast communication device 1. Then, the program can be distributed through a communication channel or recorded in a recording medium such as a CD-ROM and distributed.

REFERENCE SIGNS LIST

1 Multicast communication device
11 Packet reception unit
12 Packet reception determination unit
13 High-speed switch unit (bypass route switch unit)
14 Preprocessing unit
15 Packet transfer processing unit
16 Packet transmission unit
21 Bypass route storage unit
22 Transfer packet storage unit
23 Reference packet storage unit
24 Transfer table (transfer information)
24a TE route
24b IGP route
25 TE advertisement unit
26 IGP advertisement unit

The invention claimed is:

1. A communication device used in a multicast transfer system that transfers a multicast packet arriving at a plurality of destinations between communication devices,
wherein a packet transfer processing unit of the communication device is configured to perform operations comprising:
transferring, when an interface of an adjacent communication device adjacent to the communication device is specified as a transfer destination of a received multicast packet, the multicast packet to the specified interface, and
transferring, when the interface of the adjacent communication device adjacent to the communication device is not specified as the transfer destination of the received multicast packet, the multicast packet to a destination communication device specified as the transfer destination, wherein:
the received multicast packet includes a bit string for which a first set of bits indicates whether or not to pass through each interface of the transfer destination and a second set of bits indicates whether or not each communication device is specified as the transfer destination are arranged in order, and
the packet transfer processing unit is configured to perform operations comprising:
determining whether or not to transfer the received multicast packet by reading the bit string in order from the multicast packet; and
when a first bit of the interface of the adjacent communication device adjacent to the communication device is turned to transfer completed, turning a second bit of the adjacent communication device specified as the transfer destination to transfer completed.

2. The communication device according to claim 1, the communication device further comprising:
a packet reception determination unit,
wherein the packet reception determination unit is configured to omit transfer processing of the multicast packet by the packet transfer processing unit when the communication device is specified as the target destination of the received multicast packet.

3. The communication device according to claim 1, the communication device further comprising:
a bypass route switch unit,
wherein the bypass route switch unit is configured to control the packet transfer processing unit so as to transfer the received multicast packet to a bypass route for bypassing a fault occurrence place by adding the bypass route beforehand as the transfer destination of the received multicast packet when a fault occurs.

4. The communication device according to claim 1, wherein the received multicast packet includes a bit string for which a bit indicating whether or not to pass through each interface of the transfer destination and a bit indicating whether or not each communication device specified to be a destination candidate is to be the destination are arranged in order, and wherein the packet transfer processing unit determines whether or not to transfer the multicast packet by reading the bit string in order from the multicast packet, and, when a bit of an interface of an adjacent communication device adjacent to the communication device is turned to transfer completed, also turns a bit of the communication device specified as the destination to transfer completed.

5. A multicast transfer system configured by connecting a plurality of communication devices:

wherein an IGP (Interior Gateway Protocol) route to a first communication device specified as a destination of a multicast packet is registered in transfer information in each communication device among the plurality of communication devices in the multicast transfer system, a TE (Traffic Engineering) route specifying an interface of the first communication device specified as a transfer destination of the multicast packet is registered in the transfer information in fewer than all of the plurality of communication devices in the multicast transfer system, and a packet transfer processing unit of each communication device among the plurality of communication devices in the multicast transfer system refers to the transfer information and specifies at least one interface to pass through when transferring the multicast packet, wherein:

the multicast packet includes a bit string for which a first set of bits indicates whether or not to pass through each interface of the transfer destination and a second set of bits indicates whether or not each communication device is specified as the transfer destination are arranged in order, and the packet transfer processing unit is configured to perform operations comprising:

determining whether or not to transfer the received multicast packet by reading the bit string in order from the multicast packet; and when a first bit of the interface of the first communication device is turned to transfer completed, turning a second bit of the first communication device specified as the transfer destination to transfer completed.

6. A multicast transfer method executed by a communication device used in a transfer system that transfers a multicast packet arriving at a plurality of destinations between communication devices, the method comprising:

transferring, when an interface of an adjacent communication device adjacent to the communication device is specified as a transfer destination of a received multicast packet, the multicast packet to the specified interface, and transferring, when the interface of the adjacent communication device adjacent to the communication device is not specified as the transfer destination of the received multicast packet, the multicast packet to a destination communication device specified as the transfer destination, wherein:

the received multicast packet includes a bit string for which a first set of bits indicates whether or not to pass through each interface of the transfer destination and a second set of bits indicates whether or not each communication device is specified as the transfer destination are arranged in order, and the packet transfer processing unit is configured to perform operations comprising:

determining whether or not to transfer the received multicast packet by reading the bit string in order from the multicast packet; and when a first bit of the interface of the adjacent communication device adjacent to the communication device is turned to transfer completed, turning a second bit of the adjacent communication device specified as the transfer destination to transfer completed.

* * * * *